United States Patent [19]

Zelger et al.

[11] 4,125,150

[45] Nov. 14, 1978

[54] VENTILATING AND HEATING APPARATUS OR AIR-CONDITIONING APPARATUS, ESPECIALLY FOR MOTOR VEHICLES

[75] Inventors: Werner Zelger, Munich; Lothar Busch, Gilching, both of Germany

[73] Assignee: Bayerische Motoren Werke Aktiengesellschaft, Germany

[21] Appl. No.: 695,765

[22] Filed: Jun. 14, 1976

[30] Foreign Application Priority Data

Jun. 13, 1975 [DE] Fed. Rep. of Germany ....... 2526537

[51] Int. Cl.² .............................................. F25B 29/00
[52] U.S. Cl. ......................................... 165/16; 165/42
[58] Field of Search .............................. 165/42, 43, 16

[56] References Cited

U.S. PATENT DOCUMENTS

| | | | |
|---|---|---|---|
| 2,789,794 | 4/1957 | Moore et al. | 165/43 |
| 3,731,729 | 5/1973 | Beatenbough | 165/42 |
| 3,948,312 | 4/1976 | Misbet | 165/42 |

FOREIGN PATENT DOCUMENTS

| | | | |
|---|---|---|---|
| 2,423,188 | 4/1975 | Fed. Rep. of Germany | 165/43 |
| 1,286,811 | 8/1972 | United Kingdom | 165/43 |

*Primary Examiner*—Charles J. Myhre
*Assistant Examiner*—Theophil W. Streule, Jr.
*Attorney, Agent, or Firm*—Craig & Antonelli

[57] ABSTRACT

A ventilating and heating or air-conditioning apparatus, especially for motor vehicles, which is equipped with a heat-exchanger, a cold-air by-pass branching-off upstream of the heat-exchanger and a warm-air channel including the heat-exchanger, with the cold-air by-pass and the warm-air channel alternately controllable; a distributor space provided with ventilating- and heating-connecting openings is provided, in which the cold-air inlet-opening and the ventilating-connecting opening are disposed opposite one another while the warm-air inlet-opening as also the heating-connecting openings are arranged offset thereto.

19 Claims, 5 Drawing Figures

VENTILATING AND HEATING APPARATUS OR AIR-CONDITIONING APPARATUS, ESPECIALLY FOR MOTOR VEHICLES

The present invention relates to a ventilating and heating apparatus or air-conditioning apparatus, especially for motor vehicles, which includes a heat-exchanger, a cold-air by-pass branching off upstream of the heat-exchanger, and a warm-air channel including the heat-exchanger, whereby the cold-air by-pass and the warm-air channel are alternately controllable, and whereby the cold-air by-pass and the warm-air channel terminate in cold-air and warm-air inlet-openings of a distributor space which is provided with ventilating- and heating-connecting openings for connection with discharge-openings in the passenger space adapted to be connected therewith.

Installations of the aforementioned type serve the purpose to achieve a temperature stratification in the passenger space of motor vehicles which serves the principle of "cool head and warm legs" for achieving a high condition safety for the vehicle driver and therewith far-reachingly precludes premature fatigue with increased accident danger.

In one prior art apparatus of this type of construction according to German Pat. No. 1,284,317, the ventilating-connecting openings are arranged for this purpose inside of the distributor space in the cold-air by-pass upstream of the discharge place thereof into the warm-air channel. The distributor space thereby demands a high space requirement to enable mutually oppositely flowing cold-air and warm-air partial streams to the ventilating- and heating-connecting openings as well as a predetermined spatial configuration and coordination of the distributor space and of the inlet- and connecting-openings to the main components of the apparatus, namely, of the cold-air by-pass, of the warm-air channel and of the flaps for the control thereof.

It is the aim of the present invention to reduce both the space requirement of the distributor space and therewith of the entire apparatus as also the dependence of the spatial coordination of the cold-air and warm-air partial streams to the ventilating- and heating-connecting openings from the coordination to the main components of the apparatus, namely, of the cold-air by-pass, of the warm-air channel and of the flaps for the control thereof.

As solution to the underlying problems, the present invention provides a system in which the cold-air inlet-opening and the ventilating-connecting opening are disposed mutually opposite and in that the warm-air inlet opening as well as the heater connecting-openings are arranged offset with respect thereto. In this manner, the ventilating-connecting opening, through which the air feed takes place to the head area of the passenger space, is located within the distributor space far-reachingly directly opposite the cold-air inlet-opening. As a result thereof, cold-air flows preferredly into the ventilating-connecting opening. The warm air flowing out of the warm-air inlet-opening into the distributor space is partly prevented by the cold-air in its discharge through the ventilating-connecting opening and is thereby deflected preferredly to the heating-outlet openings arranged offset to the cold-air inlet-opening and the ventilating-connecting opening. In this manner, a desired lower temperature of the mixed air, which flows out of the ventilating-outlet opening to the head area of the passenger space, results without any other control means or control flaps with a simultaneous inflow of cold- and warm air into the distributor space, than the mixed-air which flows out of the heating-connecting openings to the leg area of the passenger space and possibly also to defroster nozzles for the windowpane heating system connected thereto. The desired temperature stratification is thus achieved by a space-saving coordination of the different inlet- and connecting-openings at the distributor space, which simultaneously enables a considerable simplification and reduction of cost of the entire installation.

According to various further features of the present invention, on the one hand, a very compact construction of the distributor space, preferably of approximately prism-shaped or cylinder-shaped, elongated overall configuration is made possible by the right angle coordination of the cold-air inlet opening to the warm-air inlet opening as well as by the matching of the width dimension of the warm-air inlet opening in relation to the lateral arrangement of the heater-connecting openings; on the other hand, a particularly compact, space-saving construction of the entire apparatus is made possible by the arrangement of the distributor space directly at a controllable cold-air by-pass opening out of the cold-air channel upstream of the heat-exchanger of the apparatus. The lay-out of the warm-air channel from the outlet of the heat-exchanger with an approximately 180°-overall deflection toward the top side thereof together with an enlargement of its width within the area thereof also favors the space-saving overall configuration of the apparatus. Finally, an additional shielding of the warm-air flowing out of the warm-air inlet-opening into the distributor space with respect to the admixture thereof to the air-mixture for the ventilating-connecting opening which is to be kept relatively cool, is achieved without any structural expenditures by an appropriate arrangement of the pivotal flap controlling the ventilating-connecting opening.

Accordingly, it is an object of the present invention to provide a ventilating and heating installation as well as possibly also an air-conditioning installation, especially for motor vehicles, which avoids by simple means the aforementioned shortcomings and drawbacks encountered in the prior art.

Another object of the present invention resides in a ventilating and heating system, respectively air conditioning system, especially for motor vehicles, which achieves a temperature stratification in the passenger space of motor vehicles by extremely simple means, involving relatively few parts.

A further object of the present invention resides in a ventilating and heating as well as air conditioning apparatus, especially for motor vehicles, which achieves the principle of cool head and warm legs of the driver by extremely simple, inexpensive means to thereby increase the safety for the vehicle driver against premature fatigue.

Still a further object of the present invention resides in a ventilating and heating apparatus, respectively air conditioning system for motor vehicles, which considerably reduces the space requirements and eliminates the need for specific design configurations to accommodate the limited space availability in the vehicle.

Another object of the present invention resides in a ventilating and heating apparatus or air-conditioning apparatus, especially for motor vehicles, which greatly reduces the space requirement of the distributor space and therewith of the entire apparatus while providing greater freedom of the various connections to the distributor space.

A further object of the present invention resides in a temperature stratification achievable with the ventilating and heating apparatus of a motor vehicle, which obviates the need for complicated controls, thereby resulting in a space-saving arrangement.

Still another object of the present invention resides in an apparatus of the type described above which permits a very compact construction and layout of the components and connections thereof.

These and other objects, features and advantages of the present invention will become more apparent from the following description, when taken in connection with the accompanying drawing which shows, for purposes of illustration only, one embodiment in accordance with the present invention, and wherein.

Figure 1:
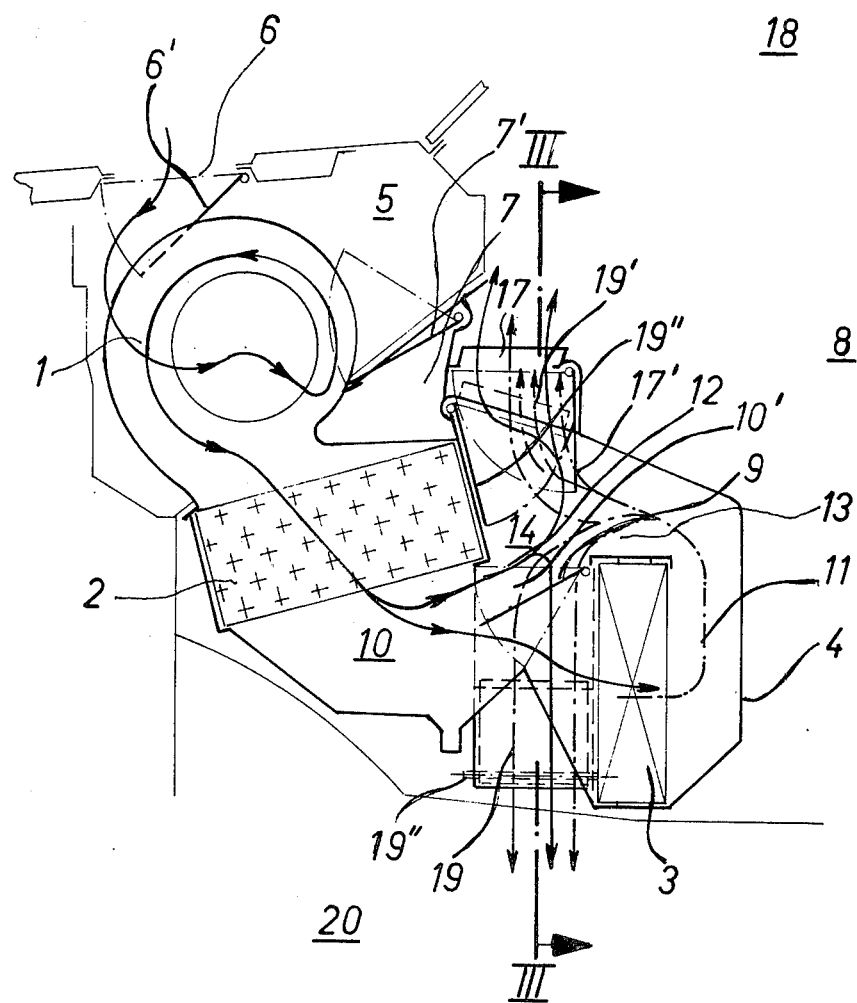
FIG. 1 is a somewhat schematic longitudinal cross-sectional view through an air conditioning apparatus for passenger motor vehicles in accordance with the present invention, with a distributor space for mixing cold-air and warm-air and for distributing the mixed-air components to the channels or outlet openings leading to the passenger space.

Referring now to the drawing wherein like reference numerals are used throughout the various views to designate like parts, the heating and air-conditioning apparatus for the installation in passenger motor vehicles essentially consists of a blower 1, of an evaporator 2 through which flows a cooling medium, and of a heat-exchanger 3 through which flows a heat carrier, especially the cooling medium of the driving engine, which are arranged within a housing 4 in this sequence in the direction of flow of the air to be heated or air conditioned. The suction side 5 of the fan or blower 1 is in communication with the outside-air by way of fresh-air openings 6 as well as with the passenger space 8 of the passenger motor vehicle by way or a recirculating-air channel 7 formed in the apparatus. The fresh-air openings 6 and the recirculating-air channel 7 are alternately controllable by respective flaps 6' and 7' coordinated thereto.

A steplessly pivotal flap 9 arranged upstream of the heat-exchanger 3 serves for splitting up the cold-air channel 10 into a cold-air by-pass 10' branching off upstream of the heat-exchanger 3 and into a warm-air channel 11 containing the heat-exchanger 3. The cold-air by-pass 10' terminates in a distributor space 14 by way of a cold-air inlet-opening 12 provided in a longer, lower (bottom) side 15 of the air distributor space 14 whereas the warm-air channel 11 terminates in the distributor space 14 by way of a warm-air inlet opening 13 provided in a longer side of the distributor space 14 arranged at right angle to the bottom side 15. A pair of rectangular ventilating-connecting openings 17 which are disposed opposite to and approximately aligned with the cold-air inlet-opening 12, are arranged in the longer, upper (top) side 15' of the distributor space 14 whereby the rectangular ventilating-connecting openings 17 are connected by way of channels or ducts (not shown) with discharge openings or discharge nozzles (not shown) directed toward the head area 18 of the passenger space 8. Heating-connecting openings 19 and 19' are located on both sides adjacent the ventilating-connecting openings 17 and therewith adjacent the direct flow area out of the cold-air inlet opening 12; of these heating-connecting openings, the heating-connecting openings 19 arranged in the bottom side 15 of the distributor space 14 are in communication by way of channels or ducts (not shown) with the leg area 20 of the passenger space 8 while the heating-connecting openings 19' provided in the top side 15' of the distributor space 14 are in communication with defroster nozzles (not shown) for heating windowpanes of the vehicle space 8 (including the windshield). The ventilating-connecting openings 17 as well as the heating-connecting openings 19 and 19' are adapted to be closed off by flaps 17' and 19" respectively coordinated thereto. The flaps 17' are so arranged at the ventilating-connecting openings 17 that in their fully opened position, they are disposed in front of the warm-air inlet opening 13. The warm-air inlet opening 13 extends over the full width of the distributor space 14 so that it overlaps in the width dimension thereof both the ventilating-connecting openings 17 as also the heating-connecting openings 19 and 19' disposed on both sides of the cold-air inlet-opening 12 and of the ventilating-connecting openings 17.

Figure 2:
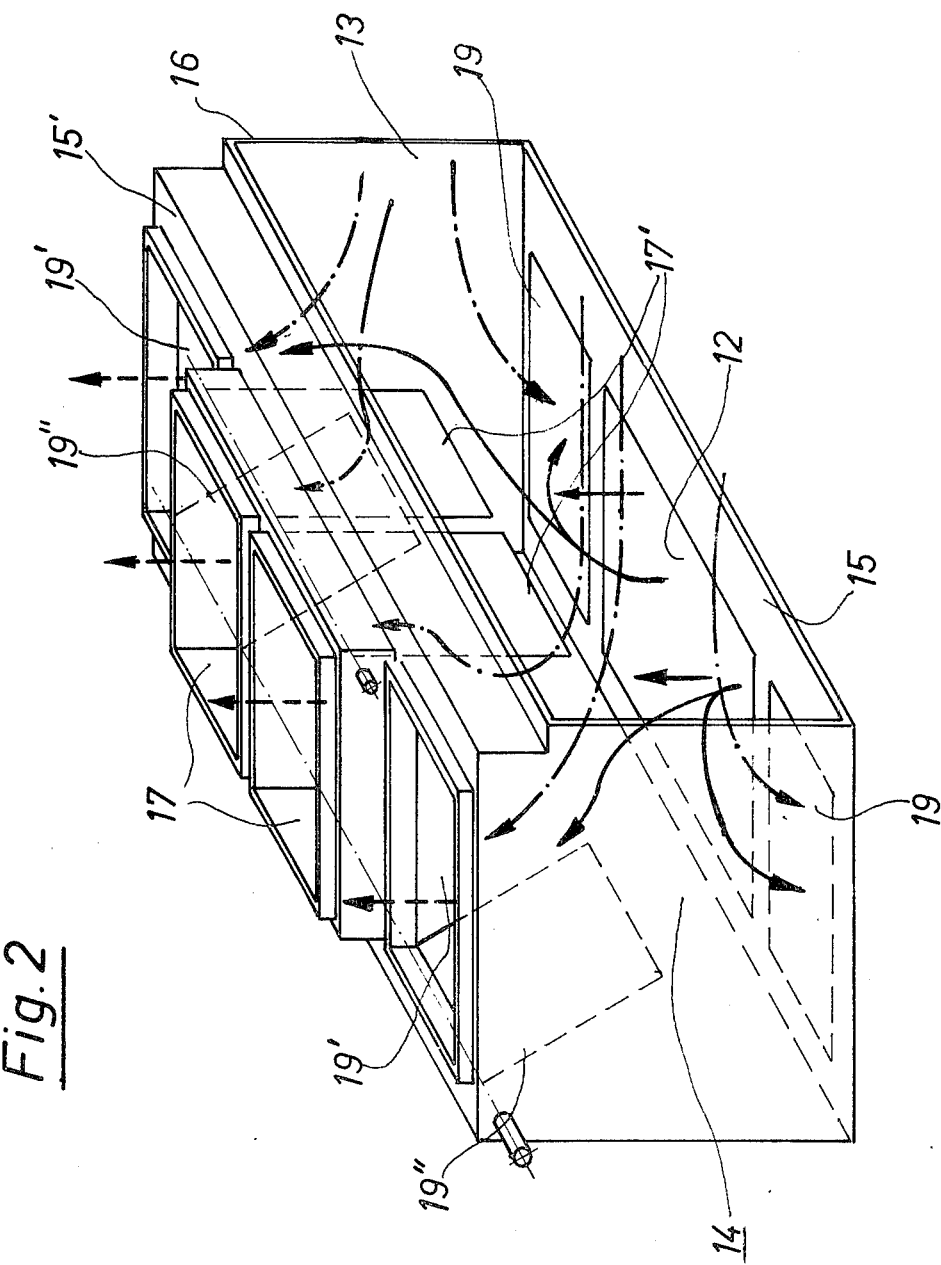
FIG. 2 is a schematic perspective view of the distributor space of the present invention, as used in the apparatus according to FIG. 1.
Figure 3:
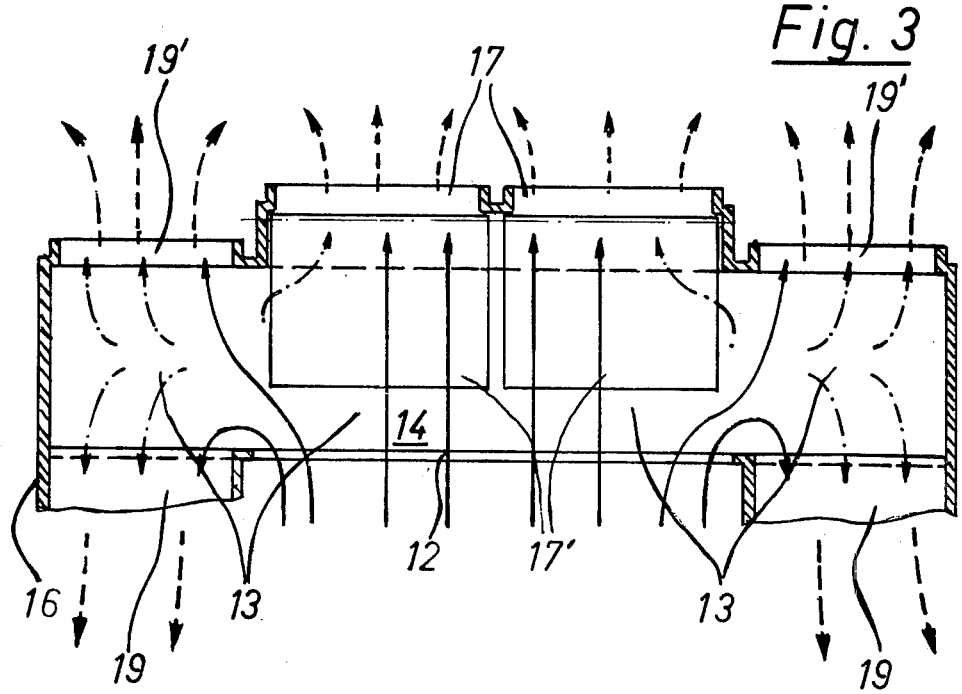
FIG. 3 is a longitudinal cross-sectional view through the distributor space taken along line III—III of FIG. 1.

The fresh-air and/or recirculated air supply by the blower 1 is cooled and dried when flowing through the evaporator 2 during the operation of the latter. The cold-air is then distributed by the flap 9 corresponding to the pivotal position thereof alternately or proportionately by way of the heat-exchanger 3 to the warm-air inlet-opening 13 and/or to the cold-air inlet opening 12. In the end position of the flap 9 at the cold-air inlet opening 12, the full air quantity is conducted through the heat-exchanger 3 and is heated up during the operation of the latter and thus flows by way of the warm-air channel 11 into the distributor space 14. In this case, exclusively warm-air flows out of all of the ventilating- and heating-connecting openings of the distributor space 14. In the opposite end position of the flap 9 at the side toward the heat-exchanger 3, the full air quantity enters the distributor space 14 by way of the cold-air inlet-opening 12 and cold-air then flows exclusively through all connecting openings of the distributor space 14. These two end positions of the flap 9 lead, on the one hand, to the greatest possible heating output of the apparatus for winter operation and, on the other, to the greatest possible ventilating and cooling output of the apparatus for summer operation. In the steplessly adjustable intermediate positions of the flap 9, there results in contrast thereto—as can be seen from FIGS. 2 and 3 by reference to the arrow lins indicated therein—a mixture of cold-air and warm-air components adjustable according to need, which flow into the distributor space 14 through the cold-air inlet-opening 12 and through the warm-air inlet opening 13. The solid lines with arrows thereby correspond to the cold-air while the dash lines with arrows correspond to the mixed-air and the dash and dotted lines with arrows to the warm-air. The cold air, by reason of the coordination of the cold-air inlet-opening 12 to the ventilating-connecting openings 17, preferably leaves the distributor space 14 out of the ventilating-connecting openings 17. In contrast thereto, cold air is fed to the heating-connecting openings 19 and 19' only in smaller proportions. In contradistinction thereto, by a reverse tendency, the warm-air entering through the warm-air inlet-opening 13 is preferredly conducted to the heating-connecting openings 19 and 19' both by reason of the offset and angular arrangement of the warm-air inlet-opening 13 to the ventilating-connecting openings 17 as also by reason of the flaps 17' projecting in their fully opened, end position into the warm-air inlet-opening 13. The warm air, in contrast thereto, reaches the ventilating-connecting openings 17 only in smaller proportions. In this manner, a temperature distribution results in the passenger space in all intermediate positions of the flap 9 with a cooler air in the head area 18 and with a warmer air in the leg area 20 of the passenger space as well as at the defroster nozzles for the windowpanes of the passenger space 8.

A temperature difference in the same sense, though to a lesser extent than the temperature difference between the mixed-air components discharged at the heating- and ventilating-connecting openings, also results from the preferred arrangement of the heating-connecting openings 19' for the defroster nozzles to the cold-air flow out of the cold-air inlet opening 12, between the heating-connecting openings 19 to the leg space outlets, on the one hand, and the heating-connecting openings 19' to the defroster nozzles, on the other. As a result thereof, also with closed ventilating-connecting openings 17, the requirement according to the principle "cool head and warm legs" is taken into consideration in a manner safe even for amateurs. An erroneous actuation of the system which impairs the condition safety, is thereby far-reachingly precluded.

From the coordination of the heating-connecting openings 19 and 19' to the cold-air and warm-air inlet openings 12 and 13, there additionally results without additional space requirements the possibility within the scope of the present invention, especially with spatial needs for connecting lines to the discharge-openings and/or discharge nozzles, to meter to the different connecting openings a cold-air proportion decreasing in the sequence of ventilating-, defroster- and leg-space connecting openings, by the offset arrangement of the different connecting openings matched differently to the cold-air inlet opening. The connecting openings which are least offset with respect to the cold-air inlet opening or which are disposed opposite thereto offset, thereby receive the largest cold-air proportion. In the illustrated embodiment, the ventilating-connecting openings 17 correspond thereto. The connecting openings which are more offset with respect to the cold-air inlet opening 12 and are not disposed opposite thereto receive a smaller cold-air proportion. In the illustrated embodiment, the heating-connecting openings 19' leading to the defroster nozzles correspond thereto. The connecting openings which have the greatest offset with respect to the cold-air inlet opening 12, receive the smallest proportion of cold air. In the illustrated embodiment, the heating-connecting openings 19 correspond thereto.

An arrangement of connecting openings in the end faces and in the side surface of the distributor space 14 opposite the warm air inlet opening 13 is thereby also possible as also with the arrangement of the ventilating-connecting openings illustrated in the given embodiment.

Figure 4:
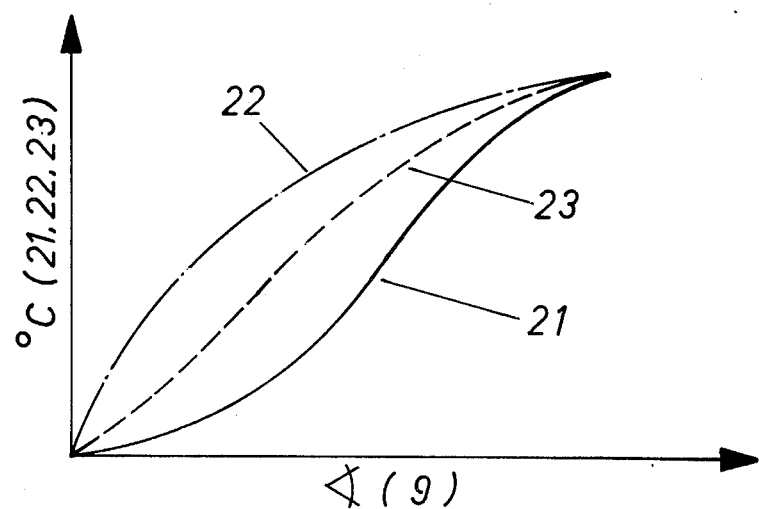
FIG. 4 is a diagram illustrating the curves representing the temperatures of the air components, which occur out of the connection of the distributor space in dependence on the adjusting angle of the flap for the temperature control.
Figure 5:
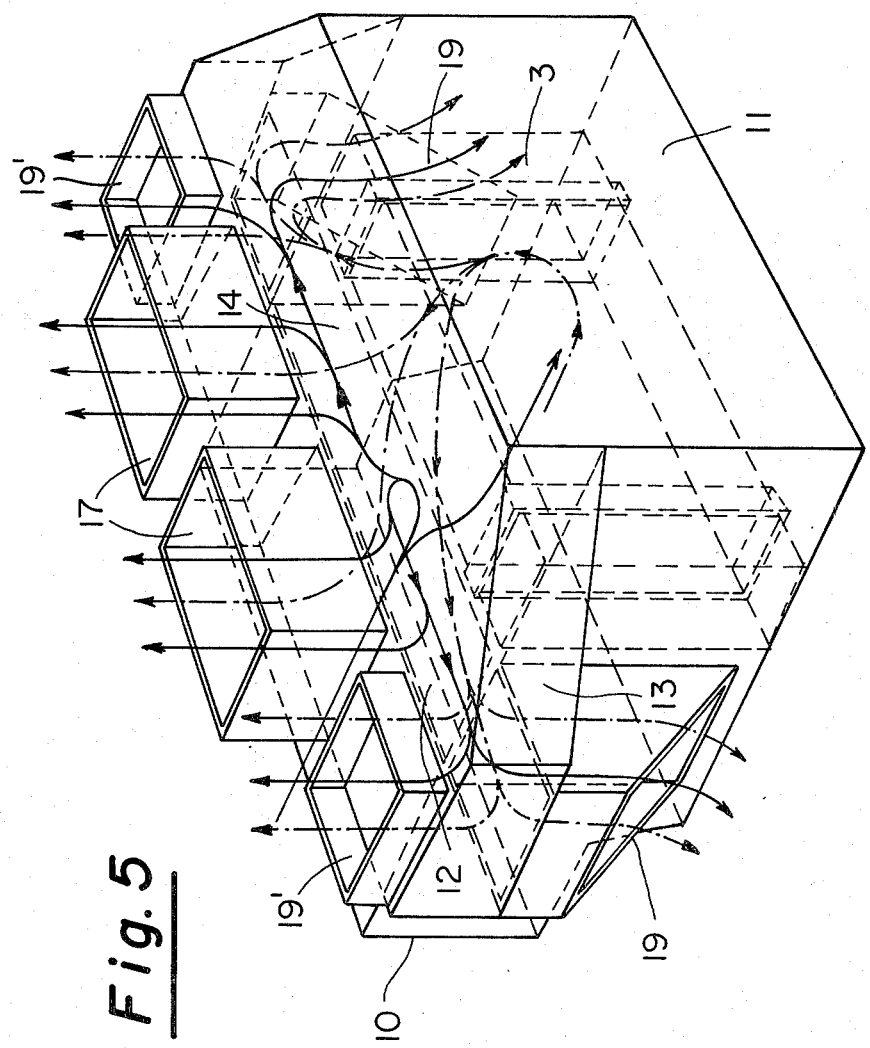
FIG. 5 is an isometric view of the distributor space defining housing with the cold and heated air flow paths represented by solid and dot-dash lines, respectively.

The diagram according to FIG. 4 represents by the full-line curve 21, the temperature of the air component which flows by way of the ventilating-connecting openings 17 into the head area 18 of the passenger space 8. The dash and dotted curve 22 represents the temperature of the air-component reaching the leg area 20 of the passenger space 8 by way of the heating-connecting openings 19 and the dash center curve 23 represents the temperature of the air-component discharged at the heating-connecting openings 19' for the defroster nozzles. All of these temperatures (21, 22 and 23) are plotted in FIG. 4 as a function of the adjusting angle of the flap 9 determining the temperature by the mixing of cold-air and warm-air components.

The diagram according to FIG. 4 illustrates clearly that with an adjustment of the flap 9 from the "warm" end position (100% heating) in the direction toward the "cold" end position, at first the curve 21 of the air-component reaching the head area 18 by way of ventilating-connecting openings 17, drops strongly and in the center position of the flap 9 (approximately 50% heating), only an approximately 30% heating of this air-component still exists. The heating of the air-component, which leaves through the heating-connecting openings 19 toward the leg area 20, in contrast thereto, is only insignificantly reduced in this adjusted angular position of the flap 9 with respect to the "warm" end position thereof. This air-component thus still has an approximately 80% heating in the center position of the flap. This ratio of the heating of the two air components is similar in its tendency over the entire adjusting range of the flap 9.

The temperature according to the curve 23 of the air-component flowing out of the heating-connecting openings 19' for the defroster nozzles lies over the entire adjusting angle of the flap 9 between the temperatures of the air components out of the ventilating-connecting openings 17 (curve 21) and out of the heating-connecting openings 19 to the leg area 20 (curve 22). The curve 23 is curved in the same direction as the curve 22 though more weakly so that in the center range of the adjusting angle of the flap 9, the air component for the defroster nozzles has a higher temperature than the air-component out of the ventilating-connecting openings 17 (curve 21) but a lower temperature than the air component for the leg area 20 (curve 22).

In the "cold" end position of the flap 9, all three air components 21, 22 and 23 reach the zero point of the heating, whereby the temperature of the air component that corresponds to the heating-connecting openings 19 and 19' drops off steeply toward the zero point whereas the temperature of the air component flowing out of the ventilating-connecting openings 17 drops off only very slightly.

The configuration of the curves 21, 22 and 23 between the "cold" and "warm" end positions, however, can be matched differently, depending on appropriateness and need, by changing the arrangement of the associated connecting-openings 17, 19 and 19' at the distributor space 14 in relation to the arrangement of the cold-air and warm-air inlet openings 12 and 13 as well as possibly by suitable measures influencing the flow, such as flap arrangement and flow guide surfaces.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a ventilating and heating apparatus, especially for motor vehicles of the type having cold air channel means having a blower means associated therewith, a warm-air channel means, a heat-exchanger means, said heat exchanger means being within said warm air channel means, a cold air by-pass means branching off upstream of the heat-exchanger means, control means for alternately controlling the cold-air by-pass means and the warm-air channel means, and a housing defining a distributor space provided with ventilating- and heating-connecting outlet openings, said distributor space of said housing being additionally provided with cold-air and warm-air inlet openings communicating with said cold-air and warm-air channel means respectively, the improvement comprising: the cold-air inlet-opening and the ventilating-connecting outlet opening being disposed at least approximately mutually opposite, and the warm-air inlet openings and heating-connecting outlet openings being arranged offset with respect thereto so as to form a temperature stratifying flow means for simultaneously directing said cold air from said cold-air inlet opening through said distributor space to said ventilating-connecting outlet and said warm air from said warm-air inlet openings through said distributor space to heating-connecting outlet openings without the need for intervening flow control means.

2. In an apparatus according to claim 1, the further improvement comprising said cold-air inlet opening and the warm-air inlet opening being arranged approximately at right angle to one another, and in that at least one pair of heating-connecting outlet openings are arranged on both sides of the ventilating-connecting outlet opening.

3. In an apparatus according to claim 2, the further improvement comprising said warm-air inlet opening overlapping at least partly the heating-connecting openings in its width direction.

4. In an apparatus according to claim 3, the further improvement comprising control means which includes a pivotal flap means controlling the ventilating-connecting outlet opening, which in the open position is arranged in front of the warm-air inlet opening and at least partly covers the same with respect to the ventilating-connecting opening.

5. In an apparatus according to claim 4, the further improvement comprising the distributor space means being elongated and having relatively longer sides, the cold-air inlet opening being provided in a first longer side of the distributor space means and the ventilating-connecting opening being disposed in a second longer side at least approximately opposite to the first side, whereas the warm-air inlet opening at least nearly completely replaces a third longer side of the distributor space means disposed between the first and second longer sides.

6. In an apparatus according to claim 5, the further improvement comprising the cold-air inlet opening being arranged within a center area of said first side, the ventilating-connecting openings being located in said second side within an area substantially opposite to said center area, and the heating-connecting openings being arranged in areas laterally adjacent to said areas of said first and second sides.

7. In an apparatus according to claim 6, the further improvement comprising a pair of heating-connecting openings leading to a leg space arranged on both sides of the cold-air inlet opening in said first side of the distributor space means and a pair of heating-connecting openings for defroster nozzles are arranged on both sides of the ventilating-connecting openings in the second side of the distributor space means.

8. In an apparatus according to claim 7, the further improvement comprising the cold-air inlet-opening of the distributor space means directly forming a controllable cold-air by-pass out of the cold-air channel upstream of the heat-exchanger means, said cold-air by-pass being directly adjoined by the distributor space means.

9. In an apparatus according to claim 8, the further improvement comprising the distributor space means being arranged above the cold-air channel and above as well as upstream of the heat-exchanger means, and the warm-air channel terminating approximately horizontally in the warm-air inlet opening of the distributor space means above the heat-exchanger means under an approximately 180° overall deflection.

10. In an apparatus according to claim 9, the further improvement comprising the warm-air channel being enlarged approximately within the area above the heat-exchanger means to a width which approximately corresponds to the width of the distributor space means determined by the dimensions of the cold-air inlet-opening and the heating-connection opening adjoining the same on both sides thereof.

11. In an apparatus according to claim 1, the further improvement comprising the control means including a pivotal flap means controlling the ventilating-connecting opening, which in the open position is arranged in front of the warm-air inlet opeing and at least partly covers the same with respect to the ventilating-connecting opening.

12. In an apparatus according to claim 1, the further improvement comprising the distributor space means being elongated and having longer sides, the cold-air inlet opening being provided in a first longer side of the distributor space means and the ventilating-connecting opening being disposed in a second longer side at least approximately opposite to the first side, whereas the warm-air inlet opening at least nearly completely replaces a third longer side of the distributor space means disposed between the first and second longer sides.

13. In an apparatus according to claim 12, the further improvement comprising the distributor space means being at least approximately prism shaped.

14. In an apparatus according to claim 12, the further improvement comprising the cold-air inlet opening being arranged within a center area of said first side, the ventilating-connecting openings being located in said second side within an area substantially opposite said center area, and the heating-connecting openings being arranged in laterally adjacent areas adjacent to the areas of said first and second sides.

15. In an apparatus according to claim 14, the further improvement comprising a pair of heating-connecting openings leading to a leg space arranged on both sides of the cold-air inlet opening in said first side of the distributor space means and a pair of heating-connecting openings for defroster nozzles being arranged on both sides of the ventilating-connecting openings in the second side of the distributor space means.

16. In an apparatus according to claim 1, the further improvement comprising the cold-air inlet opening of the distributor space means directly forming a controllable cold-air by-pass out of the cold-air channel upstream of the heat-exchanger means, which is directly adjoined by the distributor space means.

17. In an apparatus according to claim 16, the further improvement comprising the distributor space means being arranged above the cold-air channel and above as well as upstream of the heat-exhanger means, and the warm-air channel terminating approximately horizontally in the warm-air inlet opening of the distributor space means above the heat-exchanger means under an approximately 180° overall deflection.

18. In an apparatus according to claim 17, the further improvement comprising the warm-air channel being enlarged approximately within the area above the heat-exchanger means to a width which approximately corresponds to the width of the distributor space means, the width of said distributor space being determined by the dimensions of the cold-air inlet opening and the heating-connecting openings which adjoin the cold air inlet opening on both sides thereof.

19. In an apparatus according to claim 1, the further improvement comprising a cooling means associated with said cold-air channel means.

* * * * *